Dec. 3, 1935.  E. J. OSTMAN  2,022,821
AUTOMOBILE VALVE SEAT GRINDER
Filed April 15, 1935  2 Sheets—Sheet 1
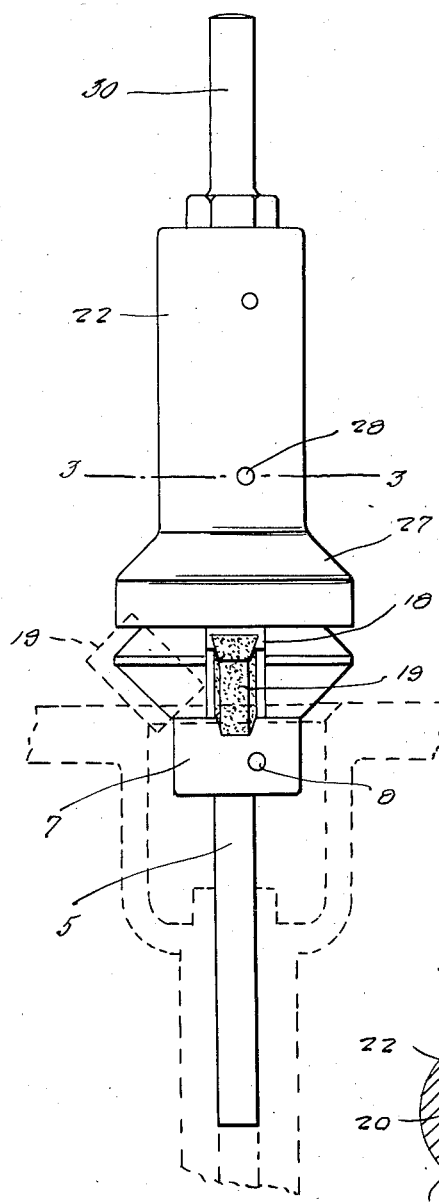
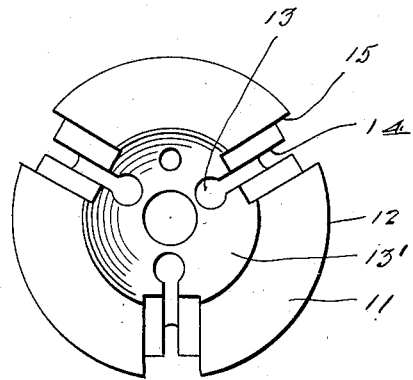
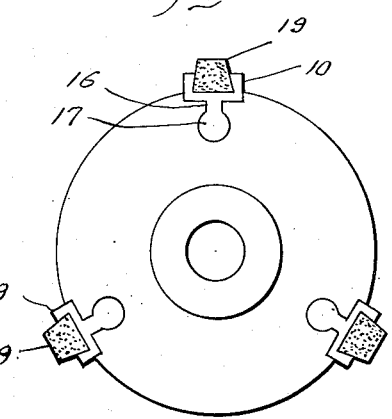
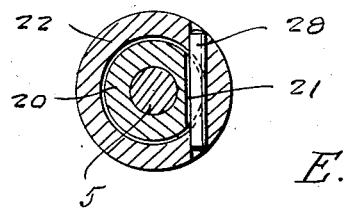
Inventor
E. J. Ostman
By Clarence A. O'Brien
Attorney Dec. 3, 1935.  E. J. OSTMAN  2,022,821
AUTOMOBILE VALVE SEAT GRINDER
Filed April 15, 1935  2 Sheets-Sheet 2
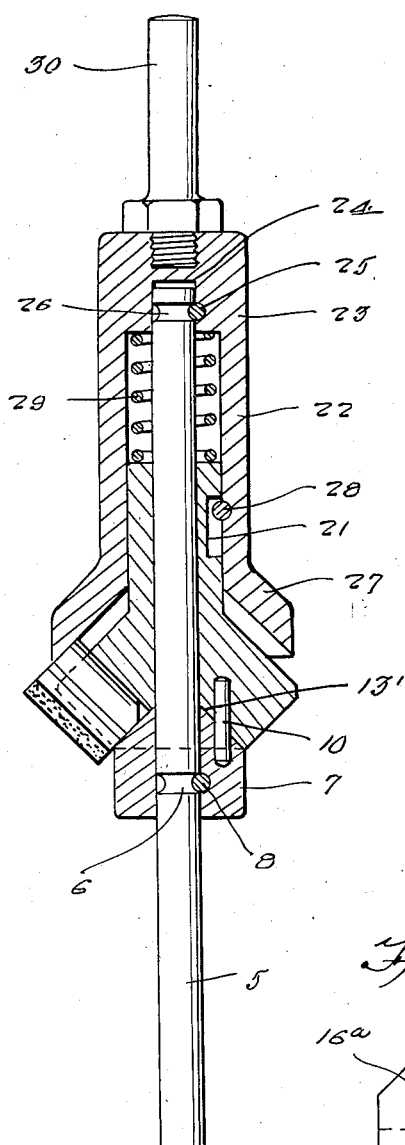
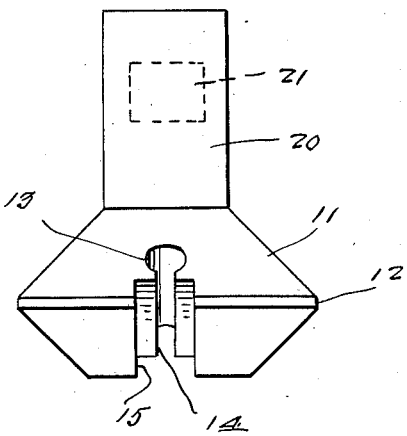
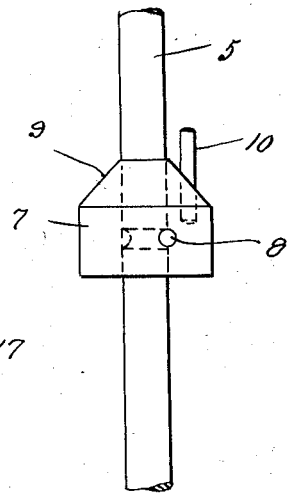
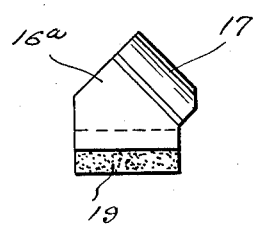
Inventor
E. J. Ostman
By Clarence A. O'Brien
Attorney Patented Dec. 3, 1935

2,022,821

UNITED STATES PATENT OFFICE 2,022,821

AUTOMOBILE VALVE SEAT GRINDER

Emil J. Ostman, Hopkins, Minn.

Application April 15, 1935, Serial No. 16,495

2 Claims. (Cl. 51—241)

This invention appertains to new and useful improvements in valve seat grinders and more particularly to a grinder which can be driven by a power drill by connecting the same with the chuck thereof.

The principal object of the present invention is to provide a grinder for a valve seat wherein the abrading elements are caused to move transversely of the seat surface as well as in a direction longitudinally of the seat, as when it is being carried around by its carriage.

Another important object of the invention is to provide a seat grinder wherein the abrading elements can be interchanged, repaired or replaced at any time in a most convenient manner.

These and various other important objects and advantages of the invention will become apparent to the reader of the following specification.

In the drawings:

Figure 1 represents a side elevational view of the grinder at work on the valve seat which is shown in dotted lines.

Figure 2 represents a longitudinal sectional view through the grinder.

Figure 3 represents a cross sectional view taken substantially on line 3—3 of Figure 1.

Figure 4 represents a side elevational view of the abrading element carrier.

Figure 5 represents a bottom plan view of the carrier.

Figure 6 represents a top plan view of the carrier with the abrading elements in place.

Figure 7 represents a fragmentary side elevational view of the stem with the swivel collar.

Figure 8 represents a side elevational view of one of the abrading elements.

Referring to the drawings wherein like numerals designate like parts, it can be seen in Figure 2, that numeral 5 represents an elongated rod or stem which at its intermediate point has a circumferentially extending groove 6. A collar 7 snugly circumscribes the stem at this groove 6 and has a removable pin 8 extending therethrough tangentially with respect to the axial bore thereto and which pin when inserted extends through the groove 6 thus swively connecting the collar 7 to the stem 5. The collar 7 is provided with a conical upper portion 9 provided with an upstanding pin 10 in parallel relation to the stem 5.

The abrading element carrier 11 is in the form of a beveled annulus, the upper portion of which is beveled inwardly and the lower portion of the same also converged inwardly from a common peripheral point 12. The bottom of this carrier 11 is provided with a conical shaped pocket 13 for receiving the conical portion 9 of the collar 7. A plurality of bores 13 extend downwardly through the annulus 11 and open into the pocket 13', these bores 13 being in converging relation to each other. A slot 14 in the annulus 11 for each of the bores 13 opens the bore throughout its entire longitudinal extent into a grooveway 15.

Each of the operating elements consists of the holder 16 which are provided with a taper head 17 at one end for engagement into the corresponding bore 13, the holder 16 extends through the corresponding slot 14 while the channeled head portion 18 is capable of seating in the channel 15 is adapted to carry the abrading block 19. Obviously these holders can be disconnected very readily from the carrier 11.

The carrier 11 is provided with an upstanding barrel 20 provided with a tangentially extending smooth portion 21. A bonnet structure 22 is of tubular construction, the upper portion 23 of which is closed and provided with a socket 24 for receiving the upper end of the stem 5. This socket portion of the bonnet has a cross pin 25 detachably extending therethrough for engagement into the circumferentially extending grooveway 26 at the upper end of the stem 5. The bonnet structure 22 has an outwardly flanged portion 27 which engages the upper end of the abrading element holders 16 in a manner substantially shown in Figure 2. A removable cross pin 28 extends through the bonnet structure 22 and through the smooth portion 21 of the barrel 20 in the manner shown in Figure 2, while a coiled compressible spring 29 is convoluted on the stem 5 and interposed between the closed end 23 of the bonnet 22 and the upper end of the said barrel 20. Obviously when the chuck of an electric motor drill is engaged with the upstanding shank 30 on the closed end of the bonnet 22 and pressure is exerted downwardly after the lower portion of the stem 5 has been engaged into the stem guard of a motor block, up and down motion of the drill will cause the abrading element carrier 11 to move up and down in the barrel 22, thus causing the abrading elements to move in and out of the device, thus eliminating the formation of grooves in the valve seat resulting from a fixed position of the abrading elements when rotating.

While the foregoing specification sets forth the invention in specific terms, it is to be understood that numerous changes in the shape, size and materials may be resorted to without departing from the spirit or scope of the invention as claimed hereinafter.

Having described the invention, what is claimed as new is:

1. A valve seat grinder comprising a rod for disposition into the usual valve stem guide of an internal combustion engine, a non-thrust rotatable collar on the rod, an abrading element carrier rotatably mounted on the rod adapted to bear on said collar, means for rotating the said carrier, and abrading elements carried by the said carrier.

2. A valve seat grinder comprising a rod for disposition into the usual valve stem guide of an internal combustion engine, a non-thrust rotatable collar on the rod, an abrading element carrier rotatably mounted on the rod adapted to bear on said collar, means for rotating the said carrier, and abrading elements carried by the said carrier, said means for rotating the carrier including a barrel into which the rod extends, a swiveled connection between the barrel and one end of the rod, said carrier being adapted to project into the barrel, a splined connection between the barrel and the carrier, a coiled compressible spring interposed between the carrier and one end of the barrel and a driving tool connection at one end of the barrel.

EMIL J. OSTMAN.